United States Patent [19]

Kumasaka et al.

[11] Patent Number: 4,803,338
[45] Date of Patent: Feb. 7, 1989

[54] MAGNETIC HEAD HAVING IMPROVED TRACK WIDTH NARROWING GROOVES

[75] Inventors: Noriyuki Kumasaka, Ohme; Shigekazu Otomo, Sayama; Takeo Yamashita, Tachikawa; Hideo Zama; Juichi Morikawa, both of Katsuta, all of Japan

[73] Assignee: Hitachi, Ltd., Tokyo, Japan

[21] Appl. No.: 777

[22] Filed: Jan. 6, 1987

[30] Foreign Application Priority Data

Jan. 10, 1986 [JP] Japan .................................. 61-2008

[51] Int. Cl.$^4$ ............................ G11B 5/22; G11B 5/25
[52] U.S. Cl. .................................... 360/122; 360/119; 360/120
[58] Field of Search ............... 360/120, 119, 122, 123, 360/126, 127, 110

[56] References Cited

U.S. PATENT DOCUMENTS

| 3,354,540 | 11/1967 | Duinker | 360/119 X |
| 4,361,860 | 11/1982 | Nozawa | 360/120 |
| 4,559,572 | 12/1985 | Kumasaka et al. | 360/122 |
| 4,682,256 | 7/1987 | Ayabe | 360/119 |

FOREIGN PATENT DOCUMENTS

| 0094708 | 11/1983 | European Pat. Off. | |
| 3511361 | 3/1985 | Fed. Rep. of Germany . | |
| 3538743 | 5/1986 | Fed. Rep. of Germany . | |
| 56-124112A | 3/1980 | Japan | 360/122 |
| 61-145712A | 12/1984 | Japan | 360/110 |
| 60-182507A | 9/1985 | Japan | 360/110 |

Primary Examiner—John H. Wolff
Attorney, Agent, or Firm—Antonelli, Terry & Wands

[57] ABSTRACT

In a magnetic head employing a metallic ferromagnetic material for portions defining a transducing gap, an oxide film or carbide film and a nonmagnetic metal film are provided in this order on each of track width narrowing grooves, and glass is packed on the nonmagnetic metal film, thereby preventing the deteriorations of magnetic characteristics ascribable to the reaction between the metallic ferromagnetic material and the glass and the production of bubbles ascribable to the reaction between the protective films and the glass, and to achieve the enhancements of recording and reproducing characteristics, the prevention of damages to a recording medium surface, the increase of a head lifetime and the rise of the available percentage of manufacture of the heads. When a glass film is further provided on the nonmagnetic metal film and the glass is packed thereon, more excellent effects are achieved.

19 Claims, 3 Drawing Sheets

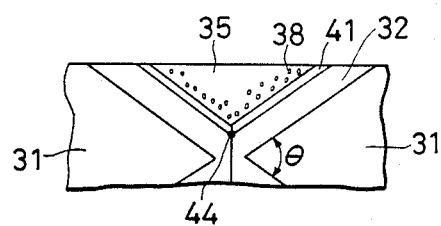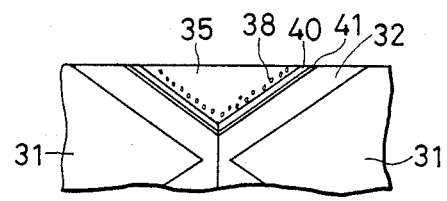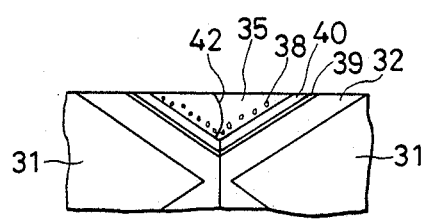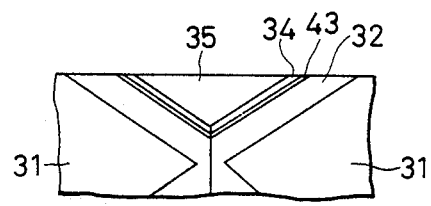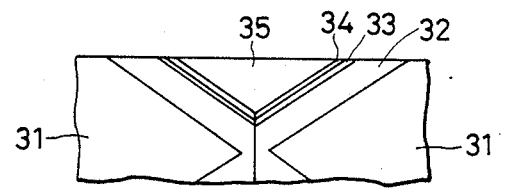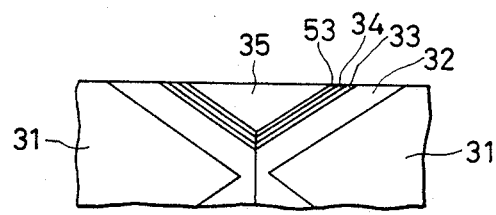

MAGNETIC HEAD HAVING IMPROVED TRACK WIDTH NARROWING GROOVES

BACKGROUND OF THE INVENTION

The present invention relates to a magnetic recording, reproducing and erasing head. More particularly, it relates to a magnetic head well-suited for high density recording, reproducing and erasing, the core material of which is a metallic ferromagnetic material and the track width narrowing grooves of which are filled with glass.

A magnetic head for high density recording has heretofore had a structure wherein a metallic ferromagnetic material exhibiting a high saturation flux density is used as the material of a magnetic core, a transducing gap is narrowed in order to raise a linear recording density, and a core width is narrowed in order to raise a track density. When note is taken of the track width of the magnetic head, a conventional narrow-track magnetic head adopts an expedient in which, from the viewpoints of the magnetic reluctance, life as abrasion-resistance, mechanical strength, etc. of the core, the magnetic core width is left broad, and grooves for narrowing are provided in only necessary parts near the transducing gap so as to establish a required track width. The narrowing grooves are filled with glass of high reliability as a nonmagnetic material.

In such a magnetic head, when the track width narrowing grooves are directly filled with the glass, the reaction between the metallic ferromagnetic material and the glass poses the problem of deterioration in the characteristics of the ferromagnetic material. Especially when the ferromagnetic material is a film forced by a thin film formation technique, the reaction thereof with the glass becomes more severe than in case of a bulky material.

To cope with this, there has been proposed, for example, a method wherein, as disclosed in the official gazette of Japanese Patent Application Laid-open No. 56-124111, a film of high-melting material such as SiO, SiO₂ or high-melting glass having a thickness of several thousand Å—several μm is deposited as a protective film between the metallic ferromagnetic material and the filling glass.

In the official gazette of Japanese Patent Application Laid-open No. 60-125909, in view of an insufficient wettability between the metallic ferromagnetic material and the glass, a method has been proposed in which the track width narrowing grooves of the magnetic head employing the metallic ferromagnetic material are provided with metal films and oxide films, whereupon the glass is packed on the oxide films. Also, the same sorts of constituents are disclosed in the official gazette of Japanese Patent Application Laid-open No. 59-142716 corresponding to U.S. Pat. No. 4,559,872.

FIG. 5 is a plan view which shows the recording medium-engaging face of a prior-art magnetic head of Japanese Patent Laid-Open No. 56-124111 employing metallic ferromagnetic films. The magnetic head is constructed of two magnetic core halves 15, 15' and a coil winding which is not shown. Each core half is made of a composite material consisting of ferrite 10 as a protective core and a metallic ferromagnetic film 11, and the track width narrowing grooves thereof are filled with glass 12 so as to form a reinforced structure. The core halves 15, 15' are joined through a nonmagnetic film 14 for a transducing gap. In the process of manufacturing the magnetic head, the metallic ferromagnetic films 11 are formed on the slant surfaces of the ferrite substrates 10, and the glass 12 is thereafter molten and packed. On this occasion, the glass 12 reacts with parts of the metallic ferromagnetic films 11 to deteriorate the magnetic characteristics of the metallic ferromagnetic films. Therefore, films 13 of high-melting material such as SiO, SiO₂ or high-melting glass at a thickness of several thousand Å—several μm are previously deposited as protective films after the deposition of the metallic ferromagnetic films, and they are used as films for preventing of the reaction between the metallic ferromagnetic films and the glass.

This method, however, has the following disadvantages:

(1) Bubbles are produced by the reaction between the glass and the protective film. The bubbles are confined in the glass and appear as holes on the recording medium-engaging face, so that they form a cause for damaging a recording medium.

(2) When the protective oxide film is thinner than several μm, the difference between the coefficient of thermal expansion of the protective oxide film and that of the metallic ferromagnetic film or the core material is not a serious problem. Hence, the range of selection for protective oxide materials widens, but the thickness is insufficient as the reaction preventive film. Consequently, the reaction layer of the protective film with the glass gets to the metallic ferromagnetic film and degrades the characteristics thereof.

(3) On the other hand, when the protective oxide film is formed thicker than several μm so as to prevent the reaction layer from getting to the metallic ferromagnetic film, the difference between the thermal expansion coefficient of the protective film and that of the glass cannot be neglected, and the glass cracks. Moreover, the amount of the bubbles increases.

FIG. 6 is a plan view of the recording medium-engaging face of a magnetic head for illustrating another prior-art example disclosed in Japanese Patent Laid-open No. 60-125909 mentioned above. This magnetic head is constructed of two core halves 15, 15' which are made of a metallic ferromagnetic material (for example, Sendust) 11'. The core halves are provided with cut grooves for narrowing a track width in the vicinity of a transducing gap, and are unitarily joined through the transducing gap 14. The joining is effected by packing glass 12. In order to enhance the close contact and the joint strength between the metallic ferromagnetic material 11' and the glass 12, the prior-art example employs a structure in which nonmagnetic metal films 16 are deposited on the glass packing grooves and are overlaid with oxide films 13, whereupon the glass is packed.

Thus, an adhered chain of materials exhibiting great affinities of the adhesion between the metallic ferromagnetic material 11' such as the alloy Sendust and the nonmagnetic metal film 16, between the nonmagnetic metalfilm 16 and the metal oxide film 13, and between the metal oxide film 13 and the glass 12 is obtained. Accordingly, the mechanical strength of the filling glass and the joint strength of the core halves become very high.

Even with the above structure, however, the following disadvantages have been found:

Likewise to the preceding prior-art example, the metal oxide film 13 exists at the surface on which the glass 12 is packed, so that bubbles are produced by the reaction. On the other hand, when a metal oxide film not reacting with the glass is formed, the bonding strength is inferior, and the glass comes off.

SUMMARY OF THE INVENTION

An object of the present invention is to eliminate the disadvantages of the prior art, and to mitigate deterioration in the characteristics of a magnetic head constructed with the combination of a metallic ferromagnetic material and glass, and to sharply heighten the available percentage of manufacture.

The above object is accomplished in such a way that each track width narrowing groove of a magnetic head employing a metallic ferromagnetic material is provided with protective films in the order of a nonmagnetic oxide film or carbide film, and a nonmagnetic metal film, on which glass is packed.

As is well known, the metallic ferromagnetic materials include an amorphous ferromagnetic alloy, an Fe-Al-Si system alloy, an Ni-Fe alloy, iron nitride, etc. of high saturation flux densities which are formed by a thin film formation technique such as vacuum evaporation or sputtering.

A material to make the protective film is selected from the group consisting of $SiO_2$, $Al_2O_3$ and $ZrO_2$ as a nonmagnetic oxide, or from the group consisting of TiC, SiC and $B_4C$ as a carbide.

The nonmagnetic metal film is made of one or more elements selected from the group consisting of Cr, Ti, Mo, Al, Cu, Si and Ge, and may well be made from an alloy whose base is composed of one or more such elements.

Especially, the present invention is so constructed that a nonmagnetic oxide film or carbide film is formed on a metallic ferromagnetic film and is further overlaid with a nonmagnetic metal film, whereupon glass is packed.

In addition, when a sputtered film of glass is further provided on the aforementioned nonmagnetic metal film and the aforementioned glass is packed on the glass film, more excellent results are obtained.

Due to the formation of the nonmagnetic oxide film or carbide film of high hardness on the metallic ferromagnetic film, the end of a track width formed by the metal ferromagnetic film becomes definite, and a track width of high dimensional accuracy is attained. Moreover, dullness at the end of a transducing gap is avoided. Since the nonmagnetic metal film is further formed on the nonmagnetic oxide film or carbide film, the packed glass is not in direct contact with the nonmagnetic oxide film or carbide film, and hence, bubbles hardly develop within the packed glass. In addition, the nonmagnetic metal film of the present invention is easily wet with a glass principally containing PbO and exhibits a high adhesion to this glass. In addition, since the nonmagnetic metal film is shallower than the reaction depth between the nonmagnetic oxide film or carbide film and the glass, the thickness thereof can be made small. Due to the thinned film, the difference between the thermal expansion coefficient thereof and those of the respective constituent materials poses almost no problem.

The metallic ferromagnetic film is formed on each protective core as a substrate by a thin film formation technique. The material of the protective core is any of an Mn-Zn ferrite and an Ni-Zn ferrite which are high-permeability ferromagnetic materials, and it may well be any of nonmagnetic materials such as crystallized glass and ceramics.

In the case where the protective core is made of a ferromagnetic substance of high permeability, it forms a magnetic path together with the metallic ferromagnetic film. Hence, the magnetic characteristics required of the metallic ferromagnetic film at the rear part of the magnetic path become less severe, so that the fabrication of the magnetic head is easy.

On the other hand, in the case of the nonmagnetic protective core, a magnetic path is established by only the metallic ferromagnetic film. Accordingly, when compared with the case of using the ferrite for the protective core, this case has such advantages (1) that the rubbing noise is little, so the signal-to-noise ratio is enhanced, and (2) that since the inductance is low, the number of turns of the coil can be increased, so the reproduction output rises.

The thickness of the film of the nonmagnetic oxide or the nonmagnetic carbide is preferably set to 0.2 $\mu$m -3 $\mu$m. Thicknesses outside the above range are not preferable as stated below. When the thickness of the film is less than the lower limit of the range, misregistration having arisen in gap defining parts causes the packed glass to enter the gap portion, and the reaction layer is formed at the end of a track. On the other hand, when the thickness is above the upper limit of the range, cracks appear in the glass.

The thickness of the nonmagnetic metal film is set to 0.1 $\mu$m-2 $\mu$m. When the thickness of the nonmagnetic metal film is less than 0.1 $\mu$m, pinholes appear in the nonmagnetic metal film and cause the production of bubbles because the glass penetrates through the pinholes to react with the film of the non-magnetic oxide or nonmagnetic carbide. On the other hand, when the thickness of the nonmagnetic film is greater than 2 $\mu$m, cracks appear in the packed glass. Therefore, thicknesses outside the specified range are not preferable.

In the case where the glass film is further formed on the nonmagnetic metal film, it is set at a thickness of 0.1 $\mu$m-1 $\mu$m. When the glass film is thinner than 0.1 $\mu$m, its effect is slight, and even when it is thicker than 1 $\mu$m, its effect does not increase more.

BRIEF DESCRIPTION OF THE DRAWINGS

FIGS. 4a thru 4d are plan views showing the major portions of the recording medium-engaging faces of several magnetic heads in the prior art, and FIGS. 4e and 4f are plan views showing the major portions of the recording medium-engaging faces of magnetic heads in one embodiment and another embodiment of the present invention, respectively.

DESCRIPTION OF THE PREFERRED EMBODIMENTS

Embodiment 1

Figure 1:
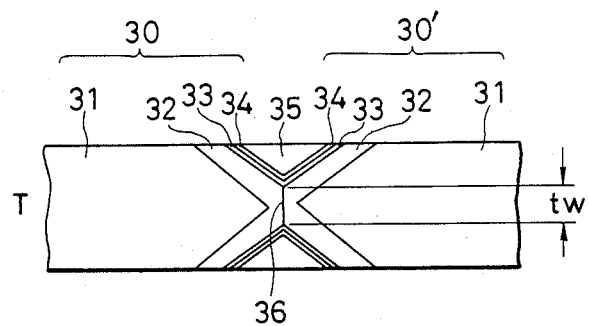
FIG. 1 is a plan view showing the recording medium-engaging face of a magnetic head in an embodiment of the present invention.
Figure 2:
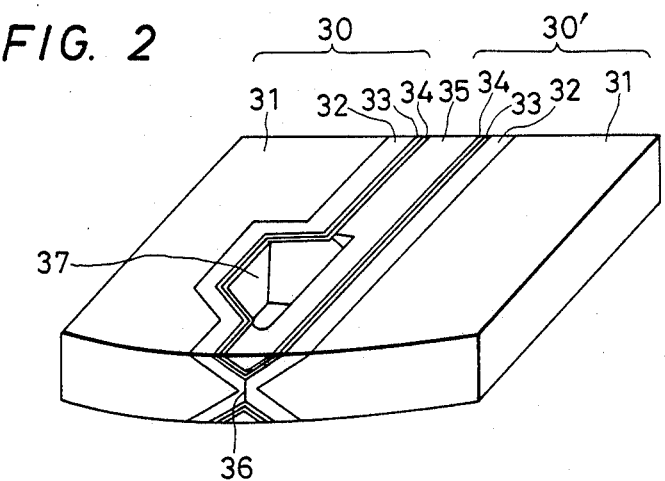
FIG. 2 is a perspective view of the magnetic head in the embodiment of the present invention.
Figure 3:
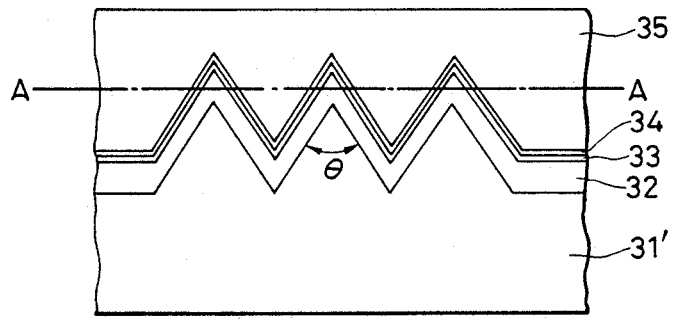
FIG. 3 is a side view showing a half-finished member for a plurality of core halves, which is obtained in a process for manufacturing the magnetic head in the embodiment of the present invention.
Figure 5:
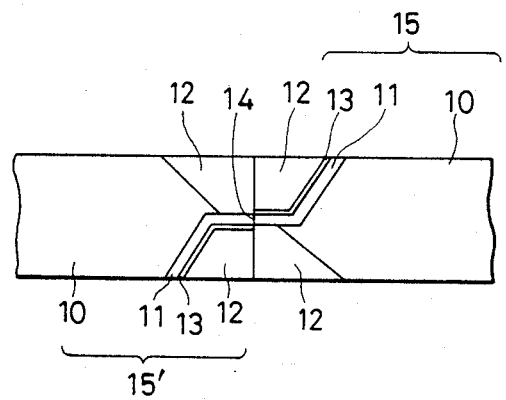
FIGS. 5 and 6 are plan views showing the recording medium-engaging faces of magnetic heads of the prior art.
Figure 6:
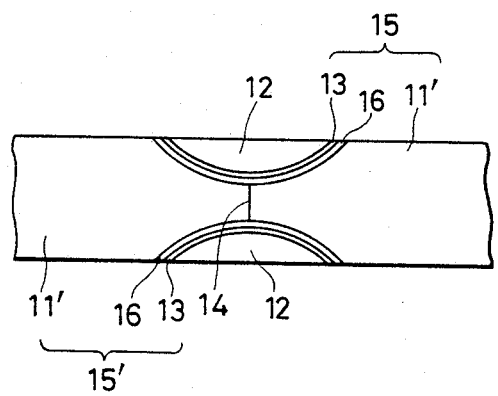

FIG. 1 is a plan view showing the recording medium-engaging face of a magnetic head in the present embodiment, while FIG. 2 is a perspective view of the magnetic head. FIG. 3 is a side view showing a half-finished member for a plurality of core halves, which is obtained in the course of fabrication in a method of manufacturing the magnetic head of the present embodiment. Further, FIGS. 4a–4d are plan views showing the essential portions of the recording medium-engaging faces of prior-art magnetic heads, and FIG. 4e is a plan view showing the essential portions of the recording medium-engaging face of the magnetic head in the present embodiment.

Referring to FIGS. 1 and 2, symbols 30 and 30' denote core halves which constitute a magnetic head core. One core half 30 is formed with a recess 37 for winding a coil. Each of the core halves 30, 30' is constructed of a protective core material 31 (in the present embodiment, made of an Mn-Zn ferrite) and a metallic ferromagnetic film 32, and it is formed with protective films 33 and 34 between the metallic ferromagnetic film 32 and glass 35. The protective films are formed in the order of the nonmagnetic oxide of carbide 33 and the nonmagnetic metal film 34. The two core halves 30 and 30' are unitarily joined through a nonmagnetic film for a transducing gap 36 by the glass 35.

In order to realize a track width $t_w$ smaller than the width T of the core, the embodiment has a structure in which the metallic ferromagnetic film 32 is formed on the slant surfaces of each protective core material 31 which is machined in an angled shape. Also, the metallic ferromagnetic film 32 and the protective films 33, 34 are formed, not only on the recording medium-engaging face, but also around the coil winding window.

Although the coil winding is omitted from the illustration of FIG. 2, it is mounted.

Concrete examples will now be described in comparison with prior-art examples.

FIG. 3 is a side view of a half-finished member for a plurality of core halves. A large number of V-shaped grooves were formed so as to leave angled protuberances at the upper surface of an Mn-Zn ferrite substrate 31'. The angle θ of the angled shape was set at 60°. Subsequently, a film 32 made of an amorphous ferromagnetic alloy of 85 at. % of Co—11.5 at. % of Nb—3.5 at. % of Zr was formed on the whole surfce of the protuberances and grooves by sputtering, this film consisting of four layers each of which had a thickness of 6 μm (not shown). In this case, $SiO_2$ films each being about 0.05 μm thick were formed betweeen the respectively adjacent ones of the amorphous ferromagnetic alloy layers similarly by sputtering, thereby forming a multilayer film for improving a high-frequency characteristic.

Next, on the metallic ferromagnetic film 32, a nonmagnetic oxide or carbide 33 and a nonmagnetic metal film 34 as protective films were formed in this order by sputtering. Thereafter, a lead glass 35 containing 85 wt. % of PbO and also 13 wt. % of $BO_3$, 1 wt. % of $SiO_2$ and 1 wt. % of $Al_2O_3$ was heated to 460° C. and packed. The magnetic core member thus constructed was ground and polished down to a plane A—A so as to expose the metallic ferromagnetic film 32 in correspondence with a track width. Two such core members were symmetrically placed, and were joined by heating the glass 35 at 460° C. and softening and melting it again. The joined product was cut into a core shape, to obtain magnetic head cores as shown in FIG. 2.

Regarding the magnetic heads fabricated by such steps, the materials and constructions of the protective films were variously studied, and the results are listed in Tables 1 and 2.

Table 1 indicates the available percentage evaluated on the basis of bubbles in glass, the reaction between a metallic ferromagnetic film and a protective film, the reaction between the metallic ferromagnetic film and the glass, and the cracking of the glass, which were investigated on magnetic heads fabricated by prior-art methods.

Table 2 indicates the results obtained on the materials and constructions of the protective films according to the present invention.

TABLE 1

| No. | Protective film | Available percent. based on Bubbles in Glass | Thickness of Reaction layer bet. Metal ferromagn. film and prot. film | Thickness of Reaction layer bet. Metal ferromagn. film and glass | Cracks of Glass |
|---|---|---|---|---|---|
| 1 | None | 50% | — | 5 μm | Nonexistent |
| 2 | $SiO_2$ sing. layer (2 μm) | 40% | 2 μm | 2 μm | Nonexistent |
| 3 | $SiO_2$ sing. layer (5 μm) | 30% | 3 μm | approx. 0 μm | Existent |
| 4 | Cr sing. layer (0.5 μm) | 85% | 0.2 μm | approx. 0 μm | Nonexistent |
| 5 | Ti sing. layer (0.5 μm) | 80% | 0.3 μm | approx. 0 μm | Nonexistent |
| 6 | (Cr/$SiO_2$) (0.5 μm/1 μm) | 50% | 1 μm | approx. 0 μm | Nonexistent |
| 7 | Cr/$Al_2O_3$ (0.5 μm/1 μm) | 40% | 1 μm | approx. 0 μm | Nonexistent |

TABLE 2

| No. | Protective film | Available percent. based on Bubbles in Glass | Thickness of Reaction layer bet. Metal ferromagn. film and prot. film | Thickness of Reaction layer bet. Metal ferromagn. film and glass | Cracks of Glass |
|---|---|---|---|---|---|
| 8 | $SiO_2$/Cr | 90% | approx. | approx. | Non- |

TABLE 2-continued

| No. | Protective film | Available percent. based on Bubbles in Glass | Thickness of Reaction layer bet. Metal ferromagn. film and prot. film | Thickness of Reaction layer bet. Metal ferromagn. film and glass | Cracks of Glass |
|---|---|---|---|---|---|
| | (0.5 μm/ 1 μm) | | 0 μm | 0 μm | existent |
| 9 | SiO$_2$/Cr (1 μm/ 0.5 μm) | 87% | approx. 0 μm | approx. 0 μm | Nonexistent |
| 10 | SiO$_2$/Cr (0.5 μm/ 0.1 μm) | 85% | approx. 0 μm | approx. 0 μm | Nonexistent |
| 11 | SiO$_2$/Ti (0.5 μm/ 0.5 μm) | 85% | approx. 0 μm | approx. 0 μm | Nonexistent |
| 12 | SiO$_2$/Mo (0.5 μm/ 0.5 μm) | 82% | approx. 0 μm | approx. 0 μm | Nonexistent |
| 13 | SiO$_2$/Ge (0.5 μm/ 0.5 μm) | 88% | approx. 0 μm | approx. 0 μm | Nonexistent |
| 14 | SiO$_2$/Si (0.5 μm/ 0.5 μm) | 83% | approx. 0 μm | approx. 0 μm | Nonexistent |
| 15 | SiO$_2$/Al (0.5 μm/ 0.5 μm) | 80% | approx. 0 μm | approx. 0 μm | Nonexistent |
| 16 | Al$_2$O$_3$/Cr (0.5 μm/ 0.5 μm) | 85% | approx. 0 μm | approx. 0 μm | Nonexistent |
| 17 | TiC/Cr (0.5 μm/ 0.5 μm) | 90% | approx. 0 μm | approx. 0 μm | Nonexistent |
| 18 | SiC/Cr (0.5 μm/ 0.5 μm) | 88% | approx. 0 μm | approx. 0 μm | Nonexistent |
| 19 | ZrO$_2$/Cr (0.5 μm/ 0.5 μm) | 90% | approx. 0 μm | approx. 0 μm | Nonexistent |
| 20 | B$_4$C/Cr (0.2 μm/ 0.5 μm) | 85% | approx. 0 μm | approx. 0 μm | Nonexistent |

FIGS. 4a–4e show the major portions of the recording medium-engaging faces of the magnetic head cores, illustrative of the results of Tables 1 and 2 as model diagrams. Among them, FIGS. 4a–4d correspond to Table 1 concerning the prior arts, and FIG. 4e corresponds to Table 2 concerning the present embodiment.

The prior-art example No. 1 in Table 1 corresponds to FIG. 4a. In this example, the glass 35 was packed directly on the metallic ferromagnetic film 32. It was found that the metallic ferromagnetic film 32 and the glass 35 reacted to form a permanent magnet film 41 whose coercive force was above 100 Oe. The permanent magnet film 41 becomes an important problem because it erases a recorded signal. It was also found that the end 44 of the transducing gap reacted to widen the gap. Further, large amounts of bubbles 38 were observed in the glass.

Example No. 2 corresponds to FIG. 4b. As the protective film, an SiO$_2$ film was formed to a thickness of 2 μm. It was found that the SiO$_2$ film 40 being 2 μm thick ws completely lost by the reaction thereof with the glass 35 and that it also reacted with the metallic ferromagnetic film 32 to form a permanent magnet film 41. Moreover, bubbles 38 were present in large amounts.

Example No. 3 indicates results obtained when an SiO$_2$ film was thickened to 5 μm so as to prevent the reaction. As shown in FIG. 4c, the part 40 of the SiO$_2$ film reacted to disappear, but a part thereof remained as an SiO$_2$ film 39, and a reaction layer did not get down to the metallic ferromagnetic film 32. However, a crack 42 appeared in the glass 35. Moreover, bubbles 38 appeared in large amounts, and favorable results were not obtained.

Examples No. 4 and No. 5 indicate results obtained when, as shown in FIG. 4d, a Cr film or Ti film 34 was formed on the metallic ferromagnetic film 32, whereupon the glass 35 was packed. With this construction, the production of bubbles was not noted, but a thin reaction layer 43 was noted at the boundary between the metallic ferromagnetic film 32 and the Cr or Ti film 34, and a magnetic layer exhibiting a coercive force of about 10 Oe. was formed. The reaction layer 43 forms a cause for degrading signals for recording and reproduction.

No. 6 is an example wherein the protective films were formed in the order of a Cr film and an SiO$_2$ film on the metallic ferromagnetic film 32, while No. 7 is an example wherein they were formed in the order of a Cr film and an Al$_2$O$_3$ film. Also in this case, the oxide film was in contact with the glass and, as in FIG. 4c, large amounts of bubbles were produced by the reaction between the glass 35 and the oxide film 40. Since the oxide film was as thin as 1 μm, no crack appeared.

Meanwhile, Table 2 indicates the experimental results based on the present invention. These results were obtained with the construction of FIG. 4e, in which on the metallic ferromagnetic film 32, the nonmagnetic oxide film or carbide film 33 and the nonmagnetic metal film 34 were formed in this order, whereupon the glass 35 was packed.

In the examples listed in Table 2, the nonmagnetic oxide films or carbide films 33 were made of SiO$_2$, Al$_2$O$_3$, ZrO$_2$, TiC, SiC and B$_4$C, and the nonmagnetic metal films 34 were made of Cr, Ti, Mo, Al, Ge and Si. They were similarly formed by sputtering.

As indicated by the results of Nos. 8–20, it was found that, as compared with the prior-art methods, the embodiment had smaller amounts of bubbles produced in the glass and exhibited a higher available percentage. It was also found that even a film as thin as 0.1–1 μm had an excellent effect of preventing the reaction.

The protective films of the present invention can preferably be provided, not only in the recording medium-engaging face, but also in the whole area where the metallic ferromagnetic film and the glass come into contact.

For example, the protective films inside the coil winding window near the transducing gap are effective to precisely define a gap depth.

The protective films of the present invention were sputtered under an Ar gas pressure of $5 \times 10^{-3}$ Torr and were sufficiently washed after the sputtering, whereupon the lead glass was molten and packed. In the case of the amorphous ferromagnetic alloy, the crystallizing temperature is 500° C.–560° C. Therefore, the glass to be packed should properly melt at 450° C.–530° C. as a condition for preventing the crystallization of the amrophous ferromagnetic alloy. As stated before, accordingly, the glass containing 75–85% of PbO in terms of weight percent (disclosed in the official gazette of Japanese Utility Model Registration Application Laid-open No. 57-195621) was used as the low-melting glass.

The packing of the glass was also performed in an Ar or N$_2$ atmosphere, but with glass of high PbO content, a part of lead oxide changed to metallic lead in some cases. In this regard, it has been revealed that, when the glass is packed in an atmosphere containing a small amount (e. g., 5 vol.%) of oxygen, the liberation of lead is prevented to increase the bonding strength.

The amorphous ferromagnetic alloy film for use in the present invention is made of a Co-based metal - metal system or metal - metalloid system. The metal - metal system is more suitable when the corrosion-resistance, the abrasion-resistance, the shift of a composition ascribable to sputtering, etc. are considered.

Meanwhile, it has been acknowledged that similar results are obtained with an alloy of 85 wt.% of Fe —6 wt.% of Al—9 wt.% of Si system (Sendust). In the case of Sendust, a sputtered film left intact is a film of great coercive force, and hence, it needs to be annealed at about 600° C. after the sputtering. Thus, since the Sendust alloy has an excellent refractoriness, it permits the glass to be packed at a temperature higher than in the case of the amorphous alloy. However, the aspect of the reaction with the protective film becomes severe at high temperatures, and temperatures of 500° C. –600° C. were appropriate for the glass packing.

Embodiment 2

In the present embodiment, a glass film 53 was further formed on the protective films of the construction of the preceding embodiment by sputtering, and the glass was packed thereon, whereby the available percentage with notice taken of the production of bubbles was raised.

Table 3 indicates the results of the experiments. According to the experimental results, the available percentage with notice taken of the bubbles in the glass was enhanced to above 90% in the way that the nonmagnetic oxide film or carbide film and the succeeding nonmagnetic metal film were formed as the protective films, that the lead glass was film ws further formed, and that the glass was thereafter packed. Thus, the close adhesion was also enhanced. As regards a glass film A, a sputtering target had a composition consisting of 85% of PbO, 13% of $B_2O_3$, 1% of $SiO_2$ and 1% of $Al_2O_3$ (in weight %). As regards glass film B, the composition consists of 68% of $SiO_2$, 15% of PbO, 10% of NaO, 6% of $K_2O$ and 1% of CaO (in weight %). When the glass film is sputtered in an atmosphere containing 5 vol.% of $O_2$ besides Ar, there is the advantage that an insufficient oxygen state can be compensated for.

For emitting gases confined within the films during the sputtering operations, a method is also appropriate in which before the packing of the glass, the structure formed with the films is heated at 300° C.–400° C. for degassing.

FIG. 4f is a plan view showing the major portions of the recording medium-engaging face of the magnetic head in the present embodiment. Numeral 53 designates the glass film provided on the nonmagnetic metal film 34.

TABLE 3

| | Protective film | Available percent. based on Bubbles in Glass |
|---|---|---|
| 1 | $SiO_2$/Cr/lead glass A (0.5 μm/0.5 μm/0.2 μm) | 95% |
| 2 | $SiO_2$/Cr/lead glass A (0.5 μm/0.2 μm/0.1 μm) | 92% |
| 3 | $SiO_2$/Cr/lead glass B (0.5 μm/0.2 μm/0.2 μm) | 92% |
| 4 | TiC/Cr/lead glass A (0.2 μm/0.2 μm/0.2 μm) | 93% |
| 5 | $SiO_2$/Ge/lead glass A (0.5 μm/0.5 μm/0.2 μm) | 92% |

TABLE 3-continued

| Protective film | Available percent. based on Bubbles in Glass |
|---|---|

According to the present invention, the following effects are attained:

(1) The problem of the reaction between a metallic ferromagnetic film and glass is eliminated, and recording and reproducing characteristics are enhanced. In other words, the invention solves the problem that recording signals are degradedby the reaction layer between the metallic ferromagnetic film and the glass.

(2) Since bubbles appearing in the glass decrease sharply, the damage to a recording medium surface attributed to the bubble parts are avoided, and the lifetime of a magnetic head prolongs. Moreover, the available percentage of manufacture of the heads is sharply raised.

What is claimed is:

1. In a magnetic head having a metallic ferromagnetic material at a portion of said magnetic head which defines a transducing gap, and having track width narrowing grooves filled with a first glass over said metallic ferromagnetic material; a magnetic head characterized in that an oxide film or carbide film is provided on said metallic ferromagnetic material, a nonmagnetic metal film is provided on said oxide film or said carbide film, and said first glass is packed on said nonmagnetic metal film.

2. A magnetic head as defined in claim 1, wherein a glass film made of a second glass is further provided between said nonmagnetic metal film and said first glass.

3. A magnetic head as defined in claim 1, wherein said metallic ferromagnetic material is formed by a ferromagnetic alloy film, said oxide film or carbide film is made of at least one substance selected from the group consisting of $SiO_2$, $Al_2O_3$, $ZrO_2$, TiC and SiC, and said nonmagnetic metal film is made of at least one element selected from the group consisting of Cr, Ti, Mo, Al, Ge and Si or any of alloys based on them.

4. A magnetic head comprising:
   two core halves, each of said core halves having an upper surface, a side surface and a slanted surface slanted at a predetermined angle between said upper surface and said side surface, a metallic ferromagnetic film provided on said upper surface and said slanted surface, a first protective film made of an oxide or carbide provided on said metallic ferromagnetic film over said slanted surface, and a second protective film made of a nonmagnetic metal provided on said first protective film, said core halves being joined with the metallic ferromagnetic films on each of said core halves facing one another and being separated by a transducing gap; and
   a glass provided between the second protective layers of each of said core halves for joining said core halves, the slanted surfaces of said core halves defining at least one track width narrowing groove, and the first and second protective films preventing reaction between said metallic ferromagnetic layer and said glass.

5. A magnetic head according to claim 4, wherein at least one of said core halves has a recess in said upper surface in which a coil winding is provided.

6. A magnetic head according to claim 4, further comprising a sputtered glass film between said second protective film of at least one of said core halves and said glass.

7. A magnetic head according to claim 6, wherein said sputtered glass film has a thickness of 0.1 μm–1.0 μm.

8. A magnetic head according to claim 4, wherein said metallic ferromagnetic film is made of a material selected from the group consisting of an amorphous ferromagnetic alloy, an Fe-Al-Si system alloy, an Ni-Fe alloy and iron nitride.

9. A magnetic head according to claim 4, wherein said first protective film is made of an oxide.

10. A magnetic head according to claim 9, wherein said oxide is a material selected from the group consisting of $SiO_2$, $Al_2O_3$ and $ZrO_2$.

11. A magnetic head according to claim 4, wherein said first protective film is made of a carbide.

12. A magnetic head according to claim 11, wherein said carbide is a material selected from the group consisting of TiC, SiC and $B_4C$.

13. A magnetic head according to claim 4, wherein said nonmagnetic metal is made of at least one element selected from the group consisting of Cr, Ti, Mo, Al, Cu, Si and Ge or is made of an alloy whose base is selected from the group consisting of Cr, Ti, Mo, Al, Cu, Si and Ge.

14. A magnetic head according to claim 4, wherein each of said core halves is made of a high permeability ferromagnetic material.

15. A magnetic head according to claim 4, wherein each of said core halves is made of a nonmagnetic material.

16. A magnetic head according to claim 4, wherein the first protective films each have a thickness of 0.2 μm–3.0 μm.

17. A magnetic head according to claim 4, wherein the second protective films each have a thickness of 0.1 μm–2.0 μm.

18. A magnetic head according to claim 4, wherein said glass has a melting point in the range of 450° C.–530° C.

19. A magnetic head according to claim 18, wherein said glass contains 75–85% by weight PbO.

* * * * *